(12) United States Patent
Zuk

(10) Patent No.: US 9,032,648 B2
(45) Date of Patent: May 19, 2015

(54) DITCH FORMING IMPLEMENT

(76) Inventor: David M. Zuk, Arborg (CA)

(*) Notice: Subject to any disclaimer, the term of this patent is extended or adjusted under 35 U.S.C. 154(b) by 362 days.

(21) Appl. No.: 13/456,462

(22) Filed: Apr. 26, 2012

(65) Prior Publication Data

US 2012/0272551 A1  Nov. 1, 2012

Related U.S. Application Data

(60) Provisional application No. 61/479,191, filed on Apr. 26, 2011.

(51) Int. Cl.
| | | |
|---|---|---|
| *E02F 5/08* | (2006.01) |
| *A01B 13/16* | (2006.01) |
| *A01B 31/00* | (2006.01) |
| *A01B 35/18* | (2006.01) |
| *E02F 3/76* | (2006.01) |
| *E02F 3/78* | (2006.01) |
| *E02F 5/14* | (2006.01) |
| *A01B 13/00* | (2006.01) |

(52) U.S. Cl.
CPC . *E02F 5/08* (2013.01); *A01B 13/16* (2013.01); *A01B 31/00* (2013.01); *A01B 35/18* (2013.01); *E02F 3/7604* (2013.01); *E02F 3/7672* (2013.01); *E02F 3/783* (2013.01); *E02F 5/145* (2013.01); *A01B 13/00* (2013.01)

(58) Field of Classification Search
CPC ........ A01B 13/16; A01B 31/00; A01B 35/18; A01B 13/00; E02F 5/08; E02F 3/7604; E02F 3/7672; E02F 3/783; E02F 5/145
USPC ..................................................... 37/92, 365
See application file for complete search history.

(56) References Cited

U.S. PATENT DOCUMENTS

| | | | | | |
|---|---|---|---|---|---|
| 1,411,999 | A | * | 4/1922 | Hartsough | 37/92 |
| 2,746,180 | A | * | 5/1956 | Ficken | 37/92 |
| 2,830,515 | A | * | 4/1958 | Zayco | 172/78 |
| 3,021,621 | A | * | 2/1962 | Needham | 37/92 |
| 3,041,750 | A | * | 7/1962 | Garnand | 37/92 |
| 3,168,785 | A | * | 2/1965 | Davis | 37/92 |
| 3,624,826 | A | | 11/1971 | Rogers | |
| 3,750,758 | A | * | 8/1973 | Bancel | 172/58 |
| 4,161,072 | A | * | 7/1979 | Pronovost | 37/93 |
| 4,612,715 | A | * | 9/1986 | Cartner | 37/92 |
| 4,712,320 | A | * | 12/1987 | Cartner | 37/92 |
| 4,958,449 | A | * | 9/1990 | Prater | 37/93 |
| 5,237,761 | A | * | 8/1993 | Nadeau et al. | 37/92 |
| 6,381,879 | B1 | | 5/2002 | Bollich | |

OTHER PUBLICATIONS

Berry, Nick; Digging a 5' trench with a tereflex on a WR450F; 2010 YouTube Video: https://www.youtube,com/watch?v=uYv-2SuNCko.*

* cited by examiner

*Primary Examiner* — Jamie L McGowan
(74) *Attorney, Agent, or Firm* — Ryan W. Dupuis; Kyle R. Satterthwaite; Ade & Company Inc.

(57) ABSTRACT

A ditch forming implement includes a frame supported for movement across the ground in a forward working direction when connected to a towing vehicle. A rotating member, for example a tire having a resilient main body and integral resilient paddles formed thereon, is rotatably supported on the frame within an upright plane oriented transversely to the forward working direction. The frame may also support a shovel on an implement shank spaced forwardly of the rotating member, an adjustable guide wheel supported rearwardly of the rotating member for controlling depth of the rotating member, and a grader blade supported forwardly and laterally offset to one side of the rotating member for widening a ditch to be formed by the implement.

20 Claims, 4 Drawing Sheets

DITCH FORMING IMPLEMENT

This application claims the benefit under 35 U.S.C. 119(e) of U.S. provisional application Ser. No. 61/479,191, filed Apr. 26, 2011.

FIELD OF THE INVENTION

The present invention relates to an implement including a rotating member for engaging the ground and throwing dirt to one side of the rotating member to form a ditch as the implement is displaced across the ground in a forward working direction.

BACKGROUND

In the field of agricultural, crops of various types often require drainage ditches to insure proper irrigation and drainage. When large amounts of water collect on an agricultural field, it is desirable to drain the water as quickly and efficiently as possible, and accordingly various devices have been proposed which attempt to readily form drainage ditches.

U.S. Pat. No. 6,381,879 by Bollich discloses a method and apparatus for forming a relatively shallow drainage ditch diagonally across crop rows. The apparatus, drawn or fitted to a tractor, incorporates a rotating cutting disk set semi-vertical and at obtuse angles to the direction of travel. The disk is adjustable in two planes and is driven either by direct drive from the tractor's PTO or by hydraulic motor. The replaceable disk is fitted with slinger plates to insure proper removal of the excavated earth. The plates are typically formed of rigid metal such that the plates are readily susceptible to damage when contacting rocks in the ground or other similar obstacles.

U.S. Pat. No. 3,624,826 by Rogers discloses an irrigation ditch cleaner consisting of a T-shaped frame bar adapted to be attached to a tractor. A transverse rotor is journaled to the frame bar and has cutting blades and fins. The rotor is adapted to be drivingly connected to the power takeoff shaft of the tractor. The frame bar has a transverse guard shield with an inclined top deflection flange, the shield being located forwardly adjacent the rotor flange overlying the rotor. The shield has spaced parallel longitudinal forwardly extending supporting skids at its bottom end adapted to slidably support the rotor in a ditch to be cleaned. The rotor includes rigid impeller blades which are similarly readily susceptible to damage when contacting rocks in the ground or other similar obstacles.

SUMMARY OF THE INVENTION

According to one aspect of the invention there is provided a ditch forming implement comprising:

a frame arranged to be supported for movement across the ground in a forward working direction;

a rotating member supported on the frame for rotation about a respective axis of rotation such that the rotating member rotates within an upright plane of rotation perpendicular to the axis of rotation and transverse to the forward working direction, the rotating member comprising:

a main body which is substantially circular about the axis of rotation; and a plurality of paddles supported on the main body at spaced apart positions in a circumferential direction about the axis of rotation;

each paddle having a working surface which extends radially outward from the main body transversely to the circumferential direction; and each paddle being formed of a resilient material.

The use of paddles which are entirely formed of resilient material ensures that the paddles can flex and are not damaged when encountering obstacles such as rocks in the ground where a ditch is formed.

Preferably the main body and the paddles of the rotating member are integrally and seamlessly formed with one another of the resilient material by using a tractor tire with deep lugs as the rotating member.

Use of a pneumatic tire as the rotating member also ensures that the body of the rotating member has some resilience to further assist the paddles in flexing over obstacles such as rocks in the ground without damage to the rotating member or the ditch forming implement in general. The frame may be configured to adjust the wheel height relative to the hitch connection to a towing vehicle which allows different sizes of tires to be used effectively.

A tire may be selected in which the paddles include a plurality of first paddles having respective working surfaces oriented at a first inclination to the circumferential direction and a plurality of second paddles having respective working surfaces oriented at a second inclination to the circumferential direction which is transverse to the first inclination, in which the first and second paddles are supported on the main body so as to alternate with one another in the circumferential direction.

Preferably the rotating member is supported on the frame so as to be substantially open and such that the tractor tire is only surrounded by a fender member which spaced above the tractor tire. The open configuration of the tire allows dirt to be thrown out of a ditch being formed while the towing vehicle moves either forwards or backwards.

When the frame is arranged for connection to a towing vehicle, preferably the frame is arranged to support the rotating member thereon such that the rotating member is laterally offset to one side of the towing vehicle. More particularly, the frame may be arranged to support the rotating member thereon such that the rotating member is aligned with wheels on one of the laterally opposed sides of the towing vehicle.

Preferably a drive member is connected to the rotating member so as to be arranged to drive rotation of the rotating member in a direction corresponding to a bottom end of the rotating member rotating inward from said one of the laterally opposed sides of the towing vehicle towards the other one of the laterally opposed sides.

The frame may be arranged to support the rotating member thereon such that the axis of rotation is substantially horizontal, transverse to the forward working direction, and offset laterally to one side of the vehicle. In this instance, the drive member is preferably arranged to drive rotation of the rotating member in a direction corresponding to a bottom end of the rotating member rotating laterally inward at a rearward inclination opposite to the forward working direction.

Preferably the frame includes an implement shank spaced forwardly of the rotating member which is arranged to support an agricultural shovel thereon so as to be arranged to engage the ground before the rotating member when displaced in the forward direction. The implement shank may be supported on the frame by a suspension mechanism such that the implement shank is arranged to be deflected relative to the frame and the rotating member supported thereon. Preferably the implement shank is centred in a lateral direction relative to the rotating member.

Preferably a guide wheel is supported on the frame rearwardly of the rotating member so as to be adjustable in height relative to the frame such that a height of the rotating member is adjustable by adjusting the height of the guide wheel relative to the frame.

In some instances, a grader blade may be supported on the frame forwardly and laterally offset to one side of the rotating member in which the grader blade has a lower working edge which is inclined inwardly and rearwardly towards the rotating member. Preferably the drive member is arranged to drive rotation of the rotating member in a direction corresponding to a bottom end of the rotating member rotating laterally inward and towards the grader blade. The grader blade may be supported on the frame so as to be arranged for angular adjustment relative to the frame about an upright axis. Furthermore, the lower working edge of the grader blade may be inclined downwardly and inwardly towards the rotating member.

When the frame includes a tool bar arranged for connecting to a towing vehicle, a first trailing arm coupled on the tool bar to extend rearwardly therefrom and supporting the rotating member thereon, and a second trailing arm coupled on the tool bar to extend rearwardly therefrom separately from the first trailing arm, preferably a first portion at an inner end of the grader blade is supported on the first trailing arm and a second portion of the grader blade is supported on the second trailing arm. In this instance the second trailing arm may be pivotal relative to the toolbar and the first trailing arm such that an elevation of the second portion of the grader blade is adjustable relative to the first portion of the grader blade.

When the frame is arranged to be supported on a towing vehicle including a power take off shaft, preferably a gearbox is supported on the frame adjacent the rotating member such that the rotating member is directly supported on an output of the gearbox and a drive member is arranged to be coupled between the power take off shaft of the towing vehicle and an input of the gearbox.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
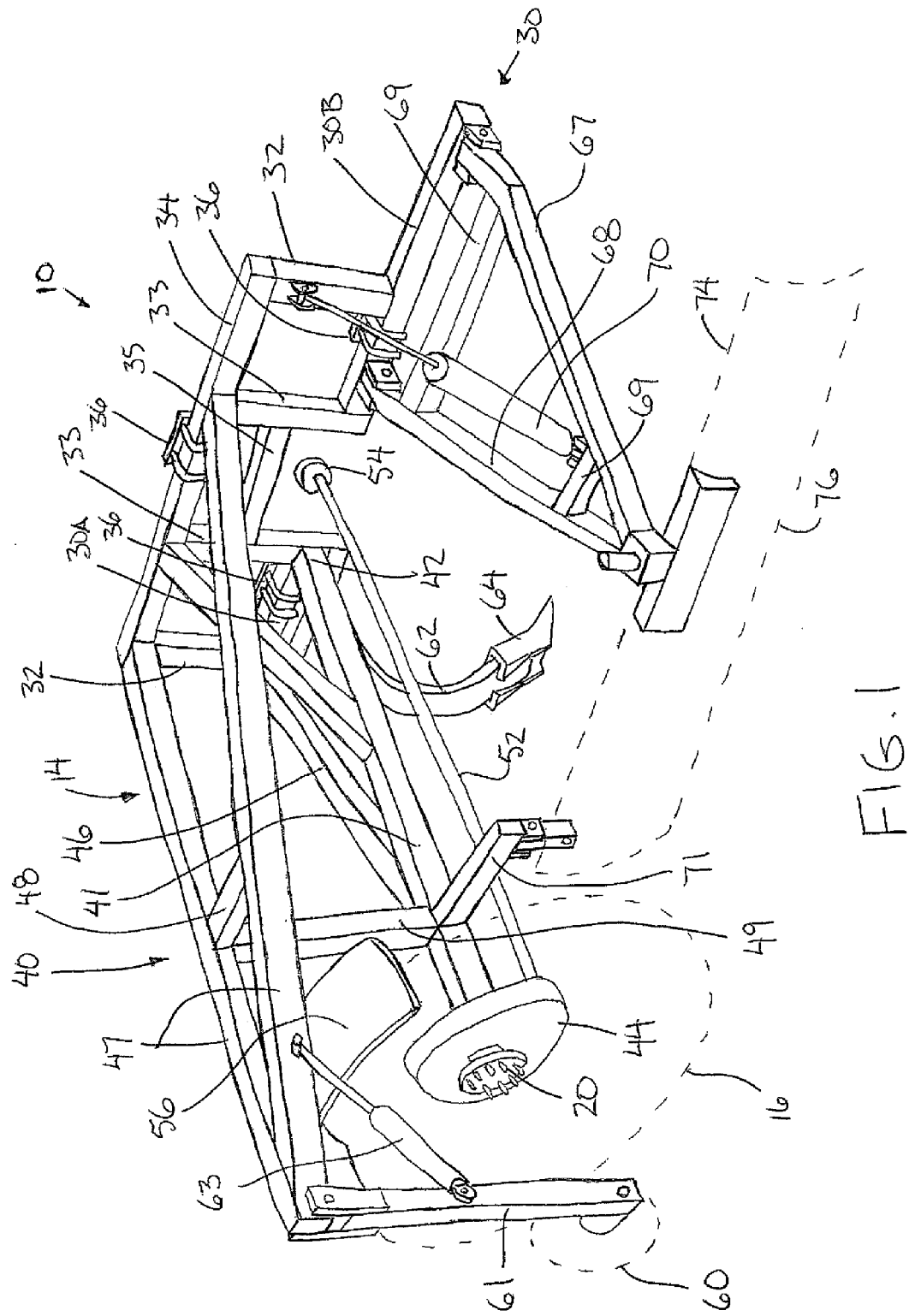
FIG. 1 is a perspective view of the ditch forming implement with the rotating member and FIG. 2 is a rear elevational view of the ditch forming implement in which the rotating member and the fender are shown removed.
Figure 2:
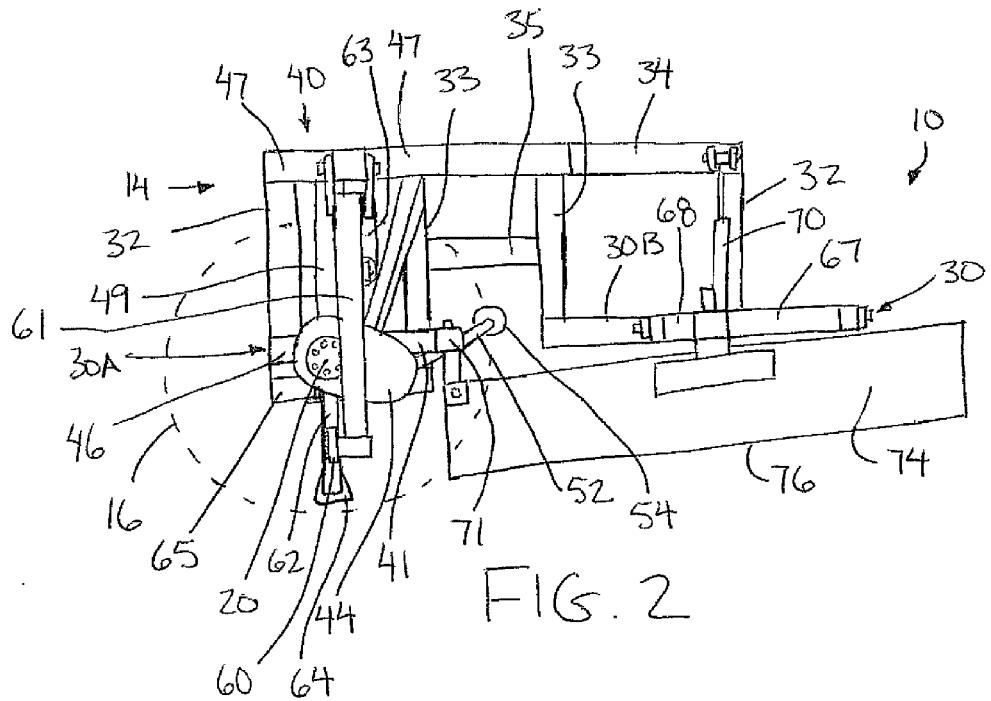
Figure 3:
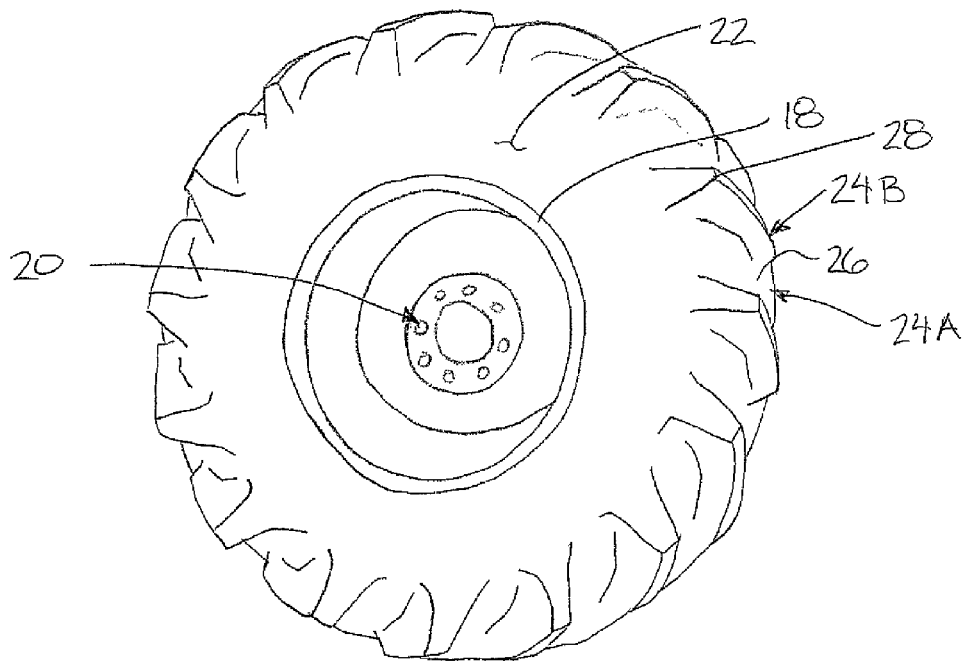
FIG. 3 is a front perspective view of the rotating member of the ditch forming implement.
Figure 4:
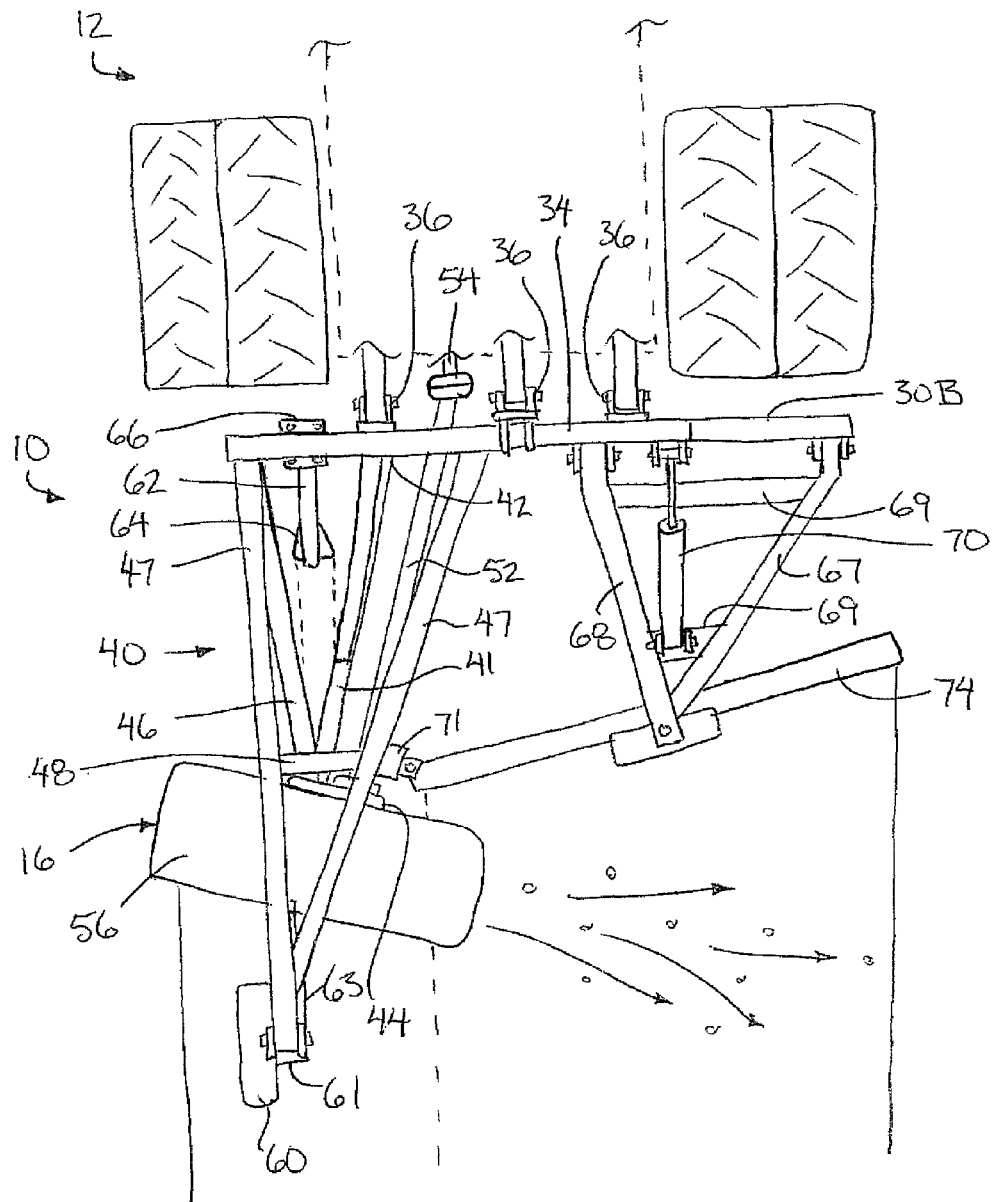
FIG. 4 is a top plan view of the ditch forming implement in which the fender is shown removed.
Figure 5:
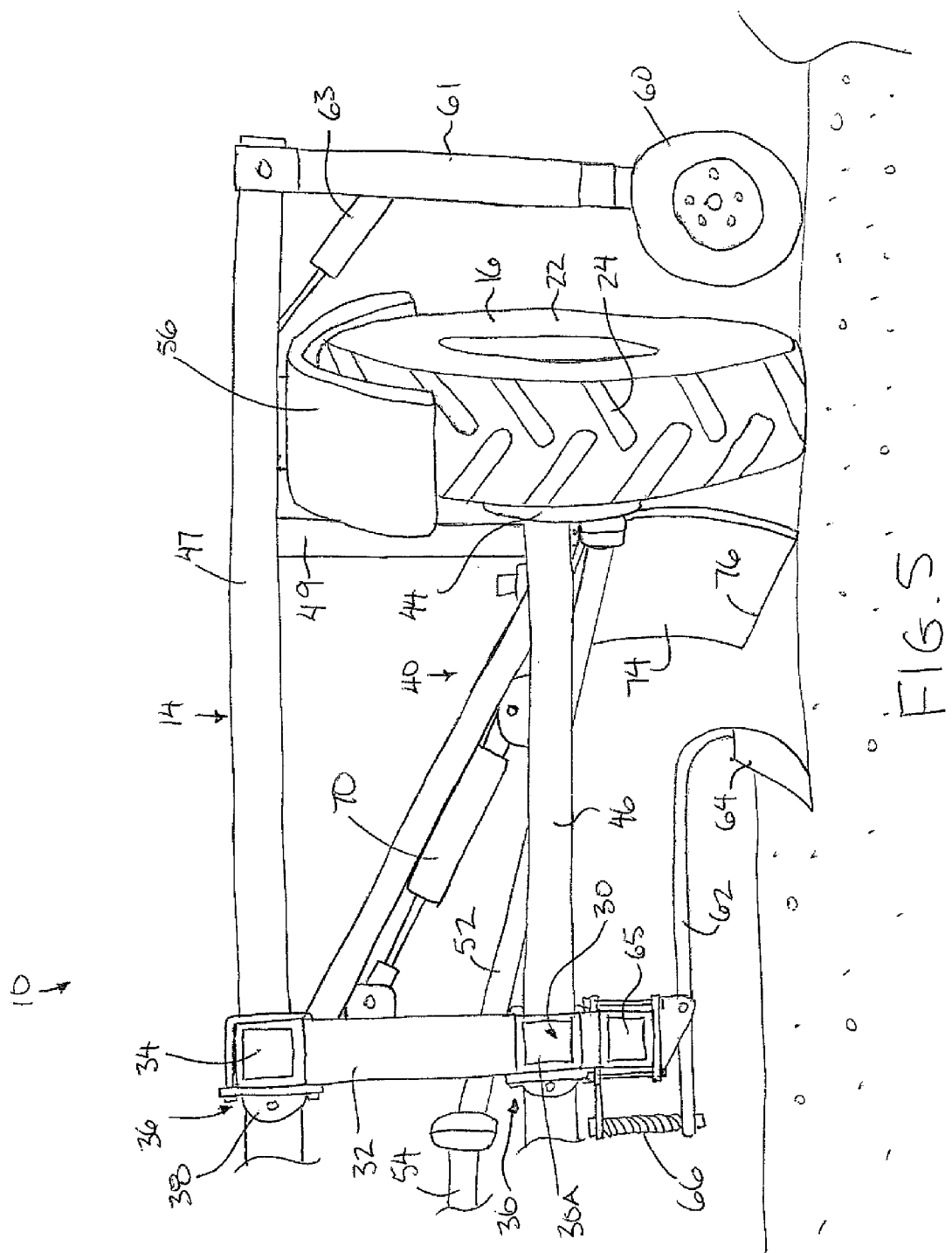
FIG. 5 is a side elevational view of the ditch forming implement.

Referring to the accompanying figures there is illustrated a ditch forming implement generally indicated by reference numeral 10. The implement 10 is suited for connection to a towing vehicle 12, for example an agricultural tractor. The towing vehicle comprises wheels supported at laterally opposed sides thereof for rolling movement together in the forward working direction.

The implement 10 comprises a frame 14 arranged to be coupled to a three point hitch of the towing vehicle such that the frame is moveable together with the towing vehicle in the forward working direction across the ground. The frame supports a rotating member 16 thereon such that rotation of the rotating member forms an elongate ditch in the forward working direction when towed by the towing vehicle substantially in alignment with the wheels offset to one side of the towing vehicle.

In the illustrated embodiment the rotating member 16 comprises a tractor tire supported on a rim 18 on the output hub 20 of the implement using suitable wheel lugs. The tire includes a main body 22 having a plurality of lugs formed thereon which define paddles 24 which engage the ground and remove dirt from the ditch being formed. The main body 22 is generally cylindrical so as to have a circular profile about the axis of rotation of the tire.

The paddles 24 are formed to be uniform, continuous and seamless with the main body so as to be formed of the same rubber material which is vulcanized in the usual manner of tractor tires. Each of the paddles extends generally radially outward from the cylindrical peripheral surface of the main body and includes a working surface which is transverse to the circular direction of rotation of the tire.

More particularly, the rotating member includes first paddles 24a and second paddles 24b which both extend outward at an inclination to the axial direction of the wheel from a centrally located inner end 26 to an outer end 28 at one of the two respective outer sides of the tire. All of the first paddles are inclined at a first inclination to the circumferential direction of rotation to extend from the inner end at the central area of the tire to a common outer side of the tire. Likewise all of the second paddles extend at a second inclination to the circumferential direction of rotation which differs from the first inclination such that the second paddles extend outward from the inner ends to respective outer ends commonly located at the other outer side of the tire. In the circumferential direction, the paddles alternate between first and second paddles about the full periphery of the tire. The working surfaces of both first and second paddles are inclined outwardly from the inner ends to the outer ends at an inclination away from the direction of rotation to be optimally oriented for throwing soil from the ditch being formed.

The frame 14 generally comprises a main tool bar 30 including a first tool bar portion 30A and a second tool bar portion 30B which are horizontal and perpendicular to the forward working direction and aligned coaxially with one another. The two tool bar portions 30A and 30B are spaced apart in a lateral direction to define a central gap along the bottom side of the front end of the frame for accommodating drive components therethrough as described in further detail below.

The frame also includes two side members 32 which extend vertically upward from respective tool bar portions of the main tool bar 30 so as to be laterally spaced apart. The two side members extend upwardly to respective top ends which are joined at opposing ends of an upper crossbar 34 parallel to the main tool bar and spaced thereabove. A pair of intermediate members 33 extend upward from inner ends of the respective tool bar portions 30A and 30B to define opposing sides of the central gap receiving the drive components therethrough. The intermediate members 35 are laterally spaced apart at intermediate positions between the side members 32 in a common vertical plane therewith. An intermediate crossbar 35 is joined between the intermediate members 33 at an intermediate height between the tool bar 30 and the upper crossbar 34 to define an upper boundary of the central gap receiving the drive components therethrough.

A pair of three point hitch brackets 36 are spaced apart on the main tool bar 30 on the first and second tool bar portions respectively and an additional three point hitch bracket 36 is centrally located between the two lower brackets on the cross bar 34. Each of the brackets 36 comprises a plate arranged to be fastened at an adjustable location along the respective bar such that the brackets are slidably adjustable in position along the respective bars to accommodate different three point hitch configurations of the towing vehicle while also permitting the brackets to be fixed in position at a selected one of plural mounting locations. Each bracket 36 further comprises a clevis mounting plate 38 extending forward from respective bracket which includes a suitable aperture therein for mounting a respective clevis attachment of the three point hitch thereon.

The frame further comprises a first trailing arm assembly 40 extending generally rearward from the first tool bar portion 30A. The first trailing arm assembly includes a first arm 41 connected at a front end 42 at a bottom end of the intermediate member 33 joined to the first tool bar portion. The first trailing arm extends rearward from the front end 42 at an outward inclination towards the rear end such that the rear end is farther from the opposing side member than the front end of the first trailing arm. The first trailing arm 40 supports a gearbox 44 on the rear end thereof in which the outlet hub 20 of the gearbox directly supports the rotating member thereon.

Additional support is provided to the first trailing arm and rotating member supported thereon by an auxiliary arm 46 which is similarly connected at a front end on the first tool bar portion so as to extend rearward to a rear end fixed to the rear end of the first trailing arm. The front end of the auxiliary arm is joined in fixed relation to the tool bar at a location spaced laterally outward in relation to the front end of the first trailing arm at one of the two laterally opposed ends of the main tool bar. The orientation of the auxiliary arm and first trailing arm are arranged such that the rear ends thereof support the rotating member for alignment in the lateral direction with one of the sets of wheels at one side of the towing vehicle. In particular, the frame supports the rotating member to be centered relative to the track of one of the wheels of the towing vehicle.

Additional support is provided to the first trailing arm 41 by a brace member fixed at a forward end to the upper crossbar adjacent the top end of the respective intermediate member 33. Yet further support is provided by an upper frame portion including two longitudinal members 47 fixedly connected at forward ends to the upper crossbar at laterally spaced positions thereon. The longitudinal members 47 extend rearwardly and laterally inwardly towards one another within a common horizontal plane spaced above the first trailing arm 40 to respective rear ends joined to one another rearwardly of the rotating member. A cross member 48 is joined between the longitudinal members forwardly of the rotating member. A post member 49 is joined vertically between the cross member 48 and the first trailing arm 40 at a location forwardly of the rotating member.

The gearbox 44 is fixed onto the first trailing arm and the auxiliary arm such that the axis of rotation of the output wheel hub 20 and rotating member supported thereon is substantially fixed relative to the arms and frame. An input 50 of the gearbox is coupled by a suitable drive member 52 to a power take off shaft 54 of the towing vehicle. Typically, the drive member comprises a drive shaft and a pair of pivoting connection joints to transfer drive from the power take off shaft to the laterally and angularly offset gearbox. The drive member extends forwardly from the gearbox through the central gap at the bottom side of the front end of the frame for connection to the PTO shaft of the towing vehicle. The gearbox typically comprises a planetary gear set therein to rotate the rotating member 16 at a suitable RPM relative to the power take off shaft.

The drive member and gearbox are configured to drive rotation of the rotating member such that the bottom of the rotating member which engages the ground is rotated in a direction corresponding to rotating laterally inward towards a lateral center of the tractor and frame, as well as towards the wheels on the laterally opposed side of the tractor from which the frame is laterally offset. The rotating member is oriented to rotate in a substantially vertical plane of rotation which is inclined relative to the working direction to extend outward at a forward inclination. The axis of rotation is thus oriented to extend generally rearward at a laterally outward inclination so that both the axis of rotation and the plane of rotation perpendicular thereto are transverse and inclined to the working direction. The direction of the rotating member corresponds to the bottom end rotating inward at a rearward inclination opposite the forward working direction corresponding to the inclination of the plane of rotation.

The rotating member 16 is supported on the frame so as to remain open and substantially unobstructed by any surrounding housing. In particular, the rotating member is only surrounded by a fender member 56 extending overtop of a portion of the rotating member through an arc of less than 180 degrees and preferably closer to 90 degrees. The fender 56 is supported on the longitudinal members 47 of the upper frame portion above the first trailing arm 40 so as to be aligned with the rotating member.

A guide wheel 60 is supported at the rear end of the upper frame portion, rearwardly of the rotating member, by an upright leg member 61. The leg member 61 is coupled at a top end to the rear end of the longitudinal members 47 so as to extend generally downwardly therefrom. By supporting the guide wheel 60 rotatably on the bottom end of the leg member 61 for rolling engagement with the ground, the guide wheel maintains the upper frame portion and the first trailing arm in fixed relation therewith at a prescribed height relative to the ground corresponding to a prescribed depth of cut of the rotating member relative to the ground. The leg is pivotal at the top end relative to the longitudinal members 47 about a horizontal axis oriented perpendicularly to the forward direction. Due to the frame being pivotal relative to the towing vehicle about a horizontal axis of the hitch brackets 36 on the main tool bar, pivoting the leg relative to the frame causes the inclination of the leg relative to the ground to be adjusted. This in turn adjusts the prescribe height of the rear end of the frame and the prescribed depth of cut of the rotating member by adjusting the downward and rearward inclination of the frame relative to the towing vehicle. Adjustment of the height of the three point hitch and hitch brackets 36 will adjust height of the forward end of the frame of the implement.

An adjustable link 63 such as a hydraulic cylinder or other form of link which is adjustable in length is pivotally connected at opposing ends to the leg member 61 and the upper frame portion of the frame above the first trailing arm to control the inclination of the leg member. As noted above, the link 63 thus controls the depth of cut of the rotating member supported at the rear end of the arms relative to the hitch brackets 36 which couple the main tool bar to the towing vehicle.

In some instances the three point hitch can be operated such that down force on the wheel is only provided by the weight of the implement, or alternatively the three point hitch can be controlled to raise or lower the frame relative to the towing vehicle to decrease or increase the pressure of engagement of the rotating member into the ground. Alternatively or together with control of the three point hitch connection the adjustment of the guide wheel 60 using the link 63 can also be used to control the height and pressure of the rotating member engaging the ground.

The implement 10 further includes a shank 62 supported below the first portion of the main tool bar by a mounting crossbar 65 of the frame which spans parallel and spaced below the first tool bar portion 30A in a common vertical plane with the tool bar. The shank 62 is supported on the mounting crossbar 65 at a location laterally spaced in between the front end of the first trailing arm and the front end of the auxiliary arm. More particularly, the shank 62 is laterally centered relative to the rotating member and is arranged to support a suitable agricultural shovel 64 thereon such that the shovel engages the ground forwardly of and before the rotating member to form a furrow in the ground. The shovel 64 is supported by the shank so as to be substantially fixed in height on the frame. Adjustment of the guide wheel 60 effectively adjusts the inclination of the first trailing arm as the frame pivots relative to the towing vehicle about a horizontal axis of the three point hitch connections to the main tool bar so that height of the rotating member relative to the shovel 64 on the shank 62 at the front end of the frame can also be adjusted.

The shank is supported on the tool bar by a suitable suspension mechanism 66 which allows the shank to be deflected upwardly into a deflected position when the shovel encounters obstacles in the ground; however, suitable springs on the suspension return the shovel to a working position engaging the ground to form a furrow ahead of the rotating member when no obstacles are present.

The implement 10 further comprises a second trailing arm 68 having a front end pivotally supported on the second tool bar portion 30B adjacent the other side member 32 spaced laterally inward in relation to the first trailing arm. A support arm 67 is similarly pivotally coupled at a front end on the second tool bar portion at a location spaced laterally away from the first trailing arm relative to the second trailing arm 68. The rear end of the support arm 67 is joined to the rear end of the second trailing arm so as to be fixed together in a common plane. The front ends of the arms thus pivot together about a horizontal pivot axis perpendicular to the forward direction. A pair of lateral brace members 69 are fixed laterally between the two arms 68 and 67 at longitudinally spaced positions for additional structural support. The second trailing arm extends generally rearward to a rear end which is forward of the rotating member.

An adjustable link 70 is coupled between the respective side member of the frame and the second trailing arm 68. The link 70 also comprises a hydraulic actuator which controls the height of the rear end of the second trailing arm relative to the tool bar and crossbar of the frame and the first trailing arm by extension and retraction thereof.

The second trailing arm supports a grader blade 74 at the rear end thereof such that the grader blade is arranged to engage the ground ahead of the rotating member at a location offset laterally inward relative to the rotating member such that the rotating member rotates in a direction corresponding to the bottom of the member engaging the ground rotating laterally outward and away from the grader blade. The blade includes a lower working edge 76 which is inclined inwardly and rearwardly towards the rotating member 16 as well as being inclined downwardly and rearwardly such that the outer end of the blade is substantially at ground level while the inner end of the blade is recessed into the ground near the level of the rotating member 16.

The second trailing arm 68 is centrally located relative to the grader blade 74 supported thereon. The blade is connected to the second trailing arm such that the blade remains adjustable in orientation about both a vertical axis as well as a horizontal axis in the forward working direction so that the inclination inward and downward in the rear directions are adjustable in addition to the height being adjustable by using the adjustable link 70.

To provide further support to the grader blade, an inner end of the blade is pivotally suspended from an auxiliary brace member 71 extending laterally inward from the rear end of the first trailing arm. The brace member 71 sets the height of a first inner portion of the blade 74 relative to the rotating member. A remaining central or second portion of the blade 74 is pivotally coupled to the rear end of the second trailing arm such that independent pivotal adjustment of the height of the second trailing arm relative to the first trailing arm effectively adjusts the amount of downward inclination of the grader blade towards the rotating member. Pivotal connection of the grader blade to both of the trailing arms is accomplished by pivot assemblies including more than one pivot axis to allow various angular adjustments of the grader blade.

In use, the implement 10 is supported on the three point hitch of a tractor by adjusting the hitch brackets 36 to align with the three point hitch connections of the tractor. The frame is oriented such that the rotating member is aligned with the wheels at one side of the towing vehicle while the grader blade is typically centrally located in the lateral direction relative to the towing vehicle. The grader blade forms a trough which mounds the dirt inwardly and rearwardly towards the rotating member 16 which is driven to rotate in a direction laterally inward towards the grader blade at a rearward inclination to deepen the trough formed by the grader blade and widen the trough together with throwing the removed soil such that the soil is substantially evenly spread to one side of the ditch being formed.

To increase the effectiveness of the rotating member, a suitable agricultural shovel is aligned laterally centered with the rotating member at a location forward of the rotating member to loosen the soil prior to the soil being thrown by the rotating member. Typically the rotating member is positioned to penetrate deeper into the ground than the grader blade so as to be near the depth of the shovel.

In some embodiments, no grader blade or second trailing arm are required. Alternatively, the adjustable link 70 connected between the second trailing arm of the grader blade and the frame may be anchored to any other fixed location on the frame such as the longitudinal members 71 of the upper frame portion above the first trailing arm which are fixed in relation to the tool bar and upper cross bar at the front end of the frame.

In some instances, it may be more desirable to support the fender 56 above the longitudinal frame members 47 to provide greater clearance about the rotating member therebelow. This also provides for less interference between the adjustable link 63 of the guide wheel 60 and the frame.

In further embodiments the upright leg 61 supporting the guide wheel thereon may comprise additional brace members supported adjacent thereto to define a leg assembly in which the entire leg assembly remains pivotal relative to the frame to adjust the depth of cut as described above. In this instance, the upper end of the upright leg assembly may have greater width in the lateral direction at the pivotal connection to the rear end of the longitudinal members 47 of the frame. By pivotally supporting the leg assembly at laterally spaced positions on the frame, greater stability is provided to the guide wheel 60 relative to the frame.

In yet further embodiments no shovel is required such that only the rotating member 16 by itself is sufficient for effectively forming a ditch and spreading the soil removed from the ditch evenly to one side of the ditch being formed.

While use of a tire is most desirable, any other rotating member with resilient paddles would be effective at throwing soil out of a ditch being formed while being protected from damage when used in soil having rocks and stones therein.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A ditch forming implement comprising:
   a frame arranged to be supported for movement across the ground in a forward working direction;
   a rotating member supported on the frame for rotation about a respective axis of rotation such that the rotating member rotates within an upright plane of rotation perpendicular to the axis of rotation and transverse to the forward working direction, the rotating member comprising a rim rotatably supported on the frame and a pneumatic tractor tire supported on the rim, the pneumatic tractor tire comprising:
      a main body which is substantially circular about the axis of rotation; and
      a plurality of paddles supported on the main body at spaced apart positions in a circumferential direction about the axis of rotation;
      each paddle having a working surface which extends radially outward from the main body transversely to the circumferential direction; and
      the main body and each paddle being formed integrally and seamlessly with one another of a resilient material.

2. The implement according to claim 1 wherein the paddles include a plurality of first paddles having respective working surfaces oriented at a first inclination to the circumferential direction and a plurality of second paddles having respective working surfaces oriented at a second inclination to the circumferential direction which is transverse to the first inclination, the first and second paddles being supported on the main body so as to alternate with one another in the circumferential direction.

3. The implement according to claim 2 wherein the first and second paddles extend in opposing directions from respective inner ends which are substantially centered in an axial direction of the main body to respective outer ends adjacent respective first and second axially opposed sides of the main body.

4. The implement according to claim 1 wherein the tractor tire is only surrounded by a fender member which is spaced above the tractor tire.

5. The implement according to claim 1 wherein the frame is arranged for connection to a towing vehicle and wherein the frame is arranged to support the rotating member thereon such that the rotating member is laterally offset to one side of the towing vehicle.

6. The implement according to claim 1 wherein the frame is arranged for connection to a towing vehicle having wheels on laterally opposed sides thereof and wherein the frame is arranged to support the rotating member thereon such that the rotating member is aligned with wheels on one of the laterally opposed sides of the towing vehicle.

7. The implement according to claim 6 wherein there is provided a drive member arranged to drive rotation of the rotating member in a direction corresponding to a bottom end of the rotating member rotating inwardly from said one of the laterally opposed sides of the towing vehicle towards the other one of the laterally opposed sides.

8. The implement according to claim 1 wherein the frame is arranged to support the rotating member thereon such that the axis of rotation is substantially horizontal and is transverse to the forward working direction and wherein there is provided a drive member arranged to drive rotation of the rotating member in a direction corresponding to a bottom end of the rotating member rotating inward at a rearward inclination opposite the forward working direction.

9. The implement according to claim 1 wherein the frame includes an implement shank spaced forwardly of the rotating member which is arranged to support an agricultural shovel thereon so as to be arranged to engage the ground before the rotating member when displaced in the forward direction.

10. The implement according to claim 9 wherein the implement shank is supported on the frame by a suspension mechanism such that the implement shank is arranged to be deflected relative to the frame and the rotating member supported thereon.

11. The implement according to claim 9 wherein the implement shank is centered in a lateral direction relative to the rotating member.

12. The implement according to claim 1 further comprising a guide wheel supported on the frame rearwardly of the rotating member so as to be adjustable in height relative to the frame such that a height of the rotating member is adjustable by adjusting the height of the guide wheel relative to the frame.

13. The implement according to claim 1 wherein there is provided a grader blade supported on the frame forwardly and laterally offset to one side of the rotating member, the grader blade having a lower working edge which is inclined inwardly and rearwardly towards the rotating member.

14. The implement according to claim 13 wherein there is provided a drive member arranged to drive rotation of the rotating member in a direction corresponding to a bottom end of the rotating member rotating inwardly towards the grader blade.

15. The implement according to claim 13 wherein the grader blade is supported on the frame so as to be arranged for angular adjustment relative to the frame about an upright axis.

16. The implement according to claim 13 wherein the lower working edge of the grader blade is inclined downwardly and inwardly towards the rotating member.

17. The implement according to claim 13 wherein the frame includes a tool bar arranged for connecting to a towing vehicle, a first trailing arm coupled on the tool bar to extend rearwardly therefrom and supporting the rotating member thereon, and a second trailing arm coupled on the tool bar to extend rearwardly therefrom separately from the first trailing arm, and wherein a first portion at an inner end of the grader blade is supported on the first trailing arm and a second portion of the grader blade is supported on the second trailing arm, the second trailing arm being pivotal relative to the toolbar and the first trailing arm such that an elevation of the second portion of the grader blade is adjustable relative to the first portion of the grader blade.

18. The implement according to claim 1 wherein the frame is arranged to be supported on a towing vehicle including a power take off shaft and wherein there is provided:

a gearbox supported on the frame adjacent the rotating member such that the rotating member is directly supported on an output of the gearbox; and a drive member arranged to be coupled between the power take off shaft of the towing vehicle and an input of the gearbox.

19. The implement according to claim 1 for use with a towing vehicle having an output shaft, wherein the implement further comprises:

a hitch connection on the frame adapted to connect the frame to the towing vehicle in a towing configuration;

a wheel hub rotatably supported on the frame for rotation about said axis of rotation of the rotating member; and a drive member connected to the wheel hub for rotation together;

the rim of the rotating member being connected to the wheel hub by wheel lugs; and the drive member being adapted to connect to the output shaft of the towing vehicle such that rotation of the rotating member about said axis of rotation is driven by the output shaft of the towing vehicle.

20. A ditch forming implement comprising:

a frame including a tool bar arranged for connecting to a towing vehicle so as to be supported for movement across the ground in a forward working direction, a first trailing arm coupled on the tool bar to extend rearwardly therefrom and a second trailing arm coupled on the tool bar to extend rearwardly therefrom separately from the first trailing arm;

a rotating member supported on the first trailing arm of the frame for rotation about a respective axis of rotation such that the rotating member rotates within an upright plane of rotation perpendicular to the axis of rotation and transverse to the forward working direction, the rotating member comprising:

a main body which is substantially circular about the axis of rotation; and a plurality of paddles supported on the main body at spaced apart positions in a circumferential direction about the axis of rotation;

each paddle having a working surface which extends radially outward from the main body transversely to the circumferential direction; and each paddle being formed of a resilient material; and a grader blade supported on the frame forwardly and laterally offset to one side of the rotating member, the grader blade having a first portion at an inner end of the grader blade which is supported on the first trailing arm and a second portion which supported on the second trailing arm such that a lower working edge of the grader blade is inclined inwardly and rearwardly towards the rotating member;

the second trailing arm being pivotal relative to the toolbar and the first trailing arm such that an elevation of the second portion of the grader blade is adjustable relative to the first portion of the grader blade.

* * * * *